US010832241B2

(12) United States Patent
Asif et al.

(10) Patent No.: US 10,832,241 B2
(45) Date of Patent: Nov. 10, 2020

(54) TRANSACTION RESERVATION FOR BLOCK SPACE ON A BLOCKCHAIN

(71) Applicant: International Business Machines Corporation, Armonk, NY (US)

(72) Inventors: Muhammad Tayyab Asif, Singapore (SG); Pralhad D. Deshpande, Singapore (SG); Raghav Sood, Singapore (SG); Yuan Yuan, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 15/729,915

(22) Filed: Oct. 11, 2017

(65) Prior Publication Data
US 2019/0108518 A1    Apr. 11, 2019

(51) Int. Cl.
*G06Q 20/40* (2012.01)
*H04L 9/32* (2006.01)
*H04L 29/06* (2006.01)

(52) U.S. Cl.
CPC ......... *G06Q 20/401* (2013.01); *G06Q 20/405* (2013.01); *H04L 9/3236* (2013.01); *G06Q 2220/00* (2013.01); *H04L 63/08* (2013.01); *H04L 2209/38* (2013.01)

(58) Field of Classification Search
CPC ... G06Q 20/401; G06Q 20/405; H04L 9/3236
See application file for complete search history.

(56) References Cited

U.S. PATENT DOCUMENTS

| 3,812,467 | A  | * | 5/1974 | Batcher | G06F 5/015 |
|---|---|---|---|---|---|
|  |  |  |  |  | 712/300 |
| 2017/0041148 | A1 |  | 2/2017 | Pearce |  |
| 2017/0046664 | A1 |  | 2/2017 | Haldenby et al. |  |
| 2017/0091726 | A1 |  | 3/2017 | Morgan et al. |  |
| 2017/0147975 | A1 |  | 5/2017 | Natarajan et al. |  |
| 2018/0091251 | A1 | * | 3/2018 | Hanneman, Jr. | H04J 14/02 |
| 2018/0103051 | A1 | * | 4/2018 | Torkelson | H04L 63/1425 |
| 2018/0253702 | A1 | * | 9/2018 | Dowding | G06Q 20/06 |
| 2018/0323964 | A1 | * | 11/2018 | Watanabe | G06Q 20/223 |
| 2019/0065093 | A1 | * | 2/2019 | Karr | G06F 3/06 |
| 2019/0140935 | A1 | * | 5/2019 | Kikinis | G06F 17/50 |
| 2019/0190987 | A1 | * | 6/2019 | Waffner | H04L 67/104 |

FOREIGN PATENT DOCUMENTS

| WO | WO2018028777 | * | 2/2018 | H04L 29/08 |
|---|---|---|---|---|
| WO | WO2019067798 | * | 4/2019 | G06Q 20/00 |
| WO | WO-2019067798 A1 | * | 4/2019 | G06Q 20/389 |

OTHER PUBLICATIONS (Christian Decker and Roger Wattenhofer), Information Propagation in the Bitcoin Network, IEEE, 2013. (Year: 2013).*

(Continued)

*Primary Examiner* — Mamon Obeid
*Assistant Examiner* — Terry Nathan Murray

(57) ABSTRACT

An example operation may include one or more of identifying a transaction from a blockchain node to be committed to a blockchain, determining available channels for assignment, assigning a channel to the blockchain node, and transmitting the transaction to the blockchain on the assigned channel.

14 Claims, 7 Drawing Sheets

(56) References Cited

OTHER PUBLICATIONS

Junwhan Kim, Scheduling Memory Transaction in Distributed Systems, 2013, Virginia Polytechnic, Doctoral Dissertation (Year: 2013).*

Dr. Gideon Greenspan, MultiChain Private Blockchain, 2015, Coin Sciences Ltd (Year: 2015).*

Adem Efe Gencer, On Scalability of Blockchain Technologies, Aug. 2017, Cornell University, Doctoral Dissertation (Year: 2017).*

International Conference on Financial Cryptography and Data Security; On Scaling Decentralized Blockchains; Aug. 2017; Springer for Research and Development, Position Paper (Year: 2017).*

Springer for Research & Development, On Scaling Decentralized Blockchains, 2016, Position Paper (Reference) (Year: 2017).*

Decker, Christian, Information Propagation in the Bitcoin Network, IEEE, 2013 (Year: 2013).*

Anderson, Thomas, Scalable Distributed Ledger System, WIPO Machine Translation, 2018 (Year: 2018).*

Greenspan, Gideon, MultiChain Private Blockchain, Coin Sciences Ltd, 2015 (Year: 2015).*

Greenspan, Gideon, MultiChain Private Blockchain, Coin Sciences Ltd, Jun. 2015 (Year: 2015).*

Croman et al. "On scaling decentralized blockchains." International Conference on Financial Cryptography and Data Security. Springer Berlin Heidelberg, 2016.

Decker et al., "A fast and scalable payment network with bitcoin duplex micropayment channels." Symposium on Self-Stabilizing Systems. Springer International Publishing, 2015.

Bliss, Robert R., and Robert S. Steigerwald. "Derivatives clearing and settlement: A comparison of centralcounterparties and alternative structures." 4Q/2006, Economic Perspectives (2006).

Biryukov et al., "Deanonymisation of clients in Bitcoin P2P network." Proceedings of the 2014 ACM SIGSAC Conference on Computer and Communications Security. ACM, 2014.

Munsing et al., "Blockchains for Decentralized Optimization of Energy Resources in Microgrid Networks." http://escholarship.org/uc/item/80g5s6df (2017).

* cited by examiner

TRANSACTION RESERVATION FOR BLOCK SPACE ON A BLOCKCHAIN

TECHNICAL FIELD

This application generally relates to reserving transactions, and more particularly, transaction reservation for block space on a blockchain.

BACKGROUND

A blockchain may be used as a public ledger to store any type of information. Although, primarily used for financial transactions, a blockchain can store any type of information including assets (i.e., products, packages, services, status, etc.). A decentralized scheme transfers authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary.

Consensus delays can lead to failed blockchain updates. For example, when a transaction is ready for commitment and is presented via one or more blockchain members, the transaction should be written to a currently utilized blockchain block without delay. However, a block size remaining may not be sufficient to commit the current blockchain block, and consensus by blockchain peers or leaders may be required sooner rather than later to avoid other delays. Also, once consensus is reached, the update which includes the newest blockchain transaction may fail since the space of the block which was previously available may no longer be available, and thus the transaction commitment will fail and the transaction is no longer able to be written to a blockchain.

SUMMARY

One example embodiment may provide a method that includes one or more of identifying a transaction from a blockchain node to be committed to a blockchain, determining available channels for assignment, assigning a channel to the blockchain node, and transmitting the transaction to the blockchain on the assigned channel.

Another example embodiment may include an apparatus that includes a processor configured to perform one or more of identify a transaction from a blockchain node to be committed to a blockchain, determine available channels for assignment, assign a channel to the blockchain node, and a transmitter configured to transmit the transaction to the blockchain on the assigned channel.

Still another example embodiment may provide a non-transitory computer readable storage medium with instructions that when executed cause a processor to perform one or more of identifying a transaction from a blockchain node to be committed to a blockchain, determining available channels for assignment, assigning a channel to the blockchain node, and transmitting the transaction to the blockchain on the assigned channel.

DETAILED DESCRIPTION

Figure 1:
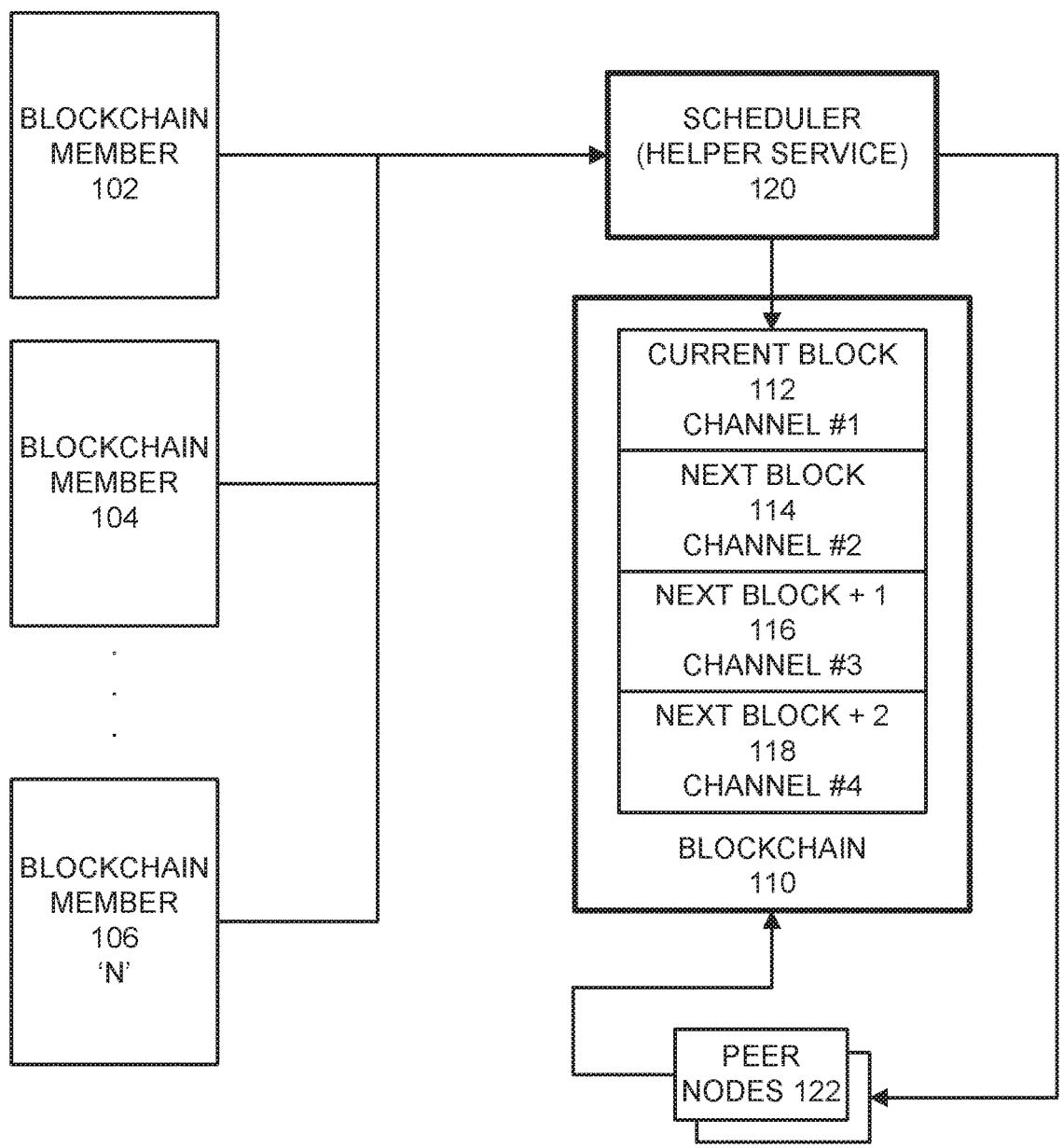
FIG. 1 illustrates a logic diagram of processing transaction reservations via a scheduler service module, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to reserving transactions on a blockchain, and in another embodiment relates to using a reservation function to provide blockchain members with transaction reservations for block space required on a blockchain.

According to example embodiments, determining a scheduling and/or reservation policy that blockchain nodes can utilize to schedule future/pending blockchain transactions to be committed to the blockchain may reduce failure rate of blockchain transaction commitment and optimize throughput. In addition to consensus delays as to approving a new blockchain transaction, peers may not be aware of other members attempting to write to the blockchain in a next available blockchain memory space. A helper service or blockchain scheduling engine may provide a function(s) to effectively plan the scheduling of blockchain transactions via reservations on channels for all blockchain members. Scheduling functionality may take into consideration, time, date, size of the transaction, an address space in a current blockchain block and other factors when providing a designated blockchain commitment reservation channel to a requesting blockchain member.

FIG. 1 illustrates a logic diagram of processing transaction reservations via a scheduler service module, according to example embodiments. Referring to FIG. 1, the configuration 100 provides various blockchain parties, members, nodes, peers, 102, 104, 106, 'N', etc., which have the privilege to submit transactions for commitment to the blockchain 110. The blockchain 110 may have an external scheduling service (i.e., scheduler 120) which operates as a helper service module (i.e. software module) to communicate with the blockchain members to identify transaction requirements and determine whether the present blockchain block can accommodate such requirements.

In operation, the helper service 120 may identify when a transaction(s) is received, needs to be committed and/or requires a channel assignment. The size of the transaction (i.e., KB), a priority of the transaction, assuming some members have priority over others, identifiers of the transaction, such as the blockchain member 102 or other members as representatives to the transaction, etc., may all be factors when deciding how to process a transaction and offer a channel assignment. An operation may be performed to identify the available blocks of a blockchain and divide those blocks into channels. Each channel may be designated as an assignable segment of the blockchain to a particular blockchain node. The channels may be blocks or a set of blocks corresponding to the actual blockchain. For example purposes, a one-to-one relationship may be established to assign one channel number or identifier to one blockchain block. The entire available blockchain block space may be divided into channels which are readily assigned to individual blockchain nodes. In this example, the current block 112 may represent a first channel, a next block 114 may be a second channel, the next block+1, 116 may be a third channel and the next block+2, 118 may be a fourth channel. The scheduler 120 may write an entry in a master schedule that identifies the channel number and the node ID of the member for reference purposes. Such information may also be used in an override procedure where one member has reserved too many channels of a blockchain and will be locked-out temporarily until a next block is available, in an effort to provide other members with block space for the current channel. Ultimately, the peer nodes 122 may still be required to vote or reach consensus whether any transaction should be approved for commitment. The peers 122 may require proof that space is available and reserved via channel assignment in order to provide consensus that the transaction is permissible. In the event that a first channel assignment is unsuccessful, the channel used for a re-attempt may be different than the first channel assigned.

Figure 2:
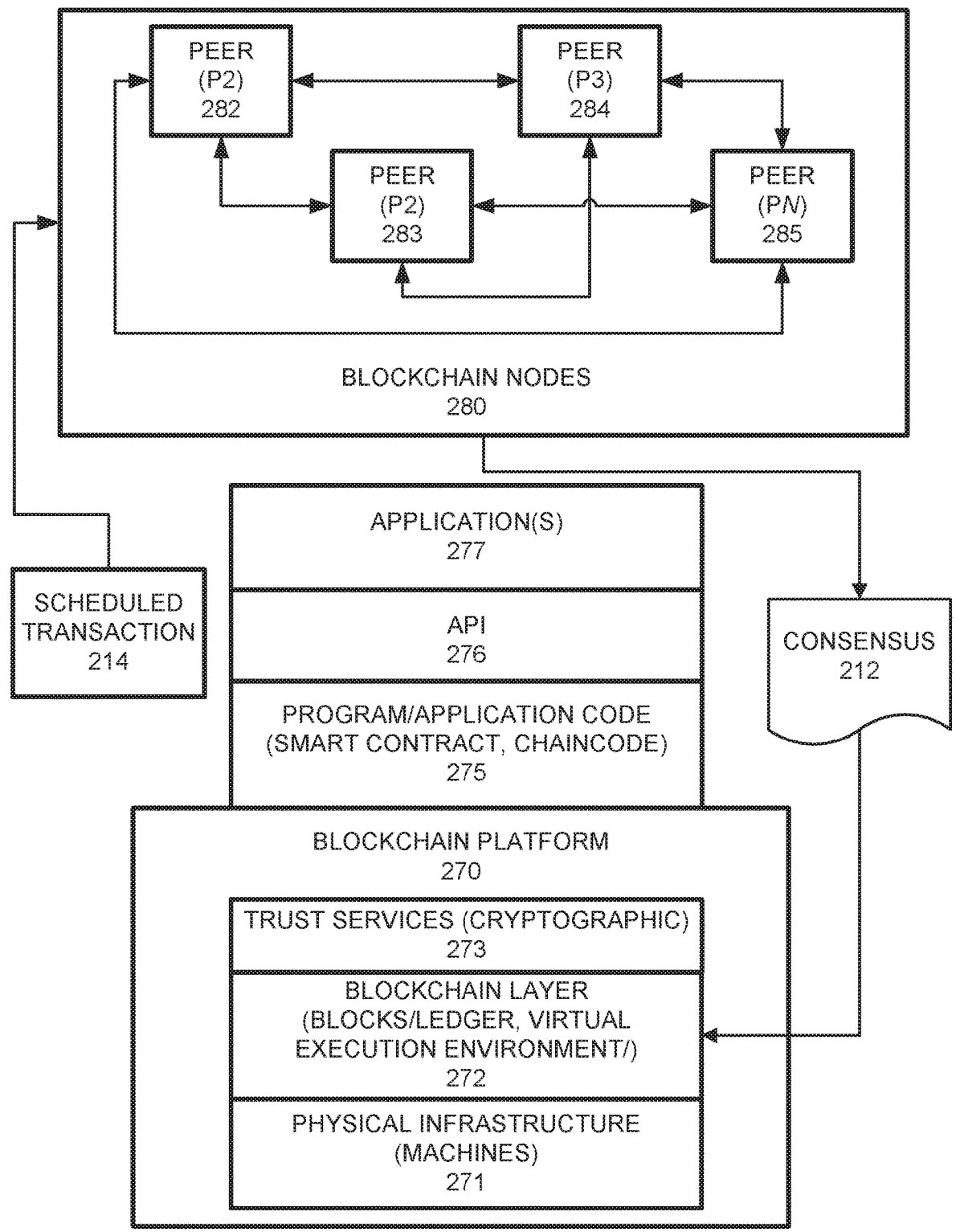
FIG. 2 illustrates an example blockchain configuration for performing blockchain transaction reservations, according to example embodiments.

FIG. 2 illustrates an example blockchain configuration for performing the query authentication and accountability function, according to example embodiments. Referring to FIG. 2, the blockchain system 200 may include certain common blockchain elements, such as a group of blockchain nodes 280, which may be assigned peer blockchain nodes 'peer nodes' 282-285, which participate in the blockchain transaction addition and validation process (consensus). Any of the blockchain peer nodes 280 may initiate new transactions and seek to write to the blockchain immutable ledger 272, a copy of which is stored on the underpinning physical infrastructure 271 of the blockchain 270. In this configuration, the customized blockchain configuration may include one or applications 277 which are linked to APIs 276 to access and execute stored program/application code (e.g., chain code and/or smart contracts) 275, which are created according to the customized configuration sought by the participants and can maintain their own state, control its own assets, and receive external information. This code can be deployed as a transaction and installed, via appending to the distributed ledger, on all blockchain peer nodes.

The blockchain platform 270 includes the various layers of blockchain data, services (e.g., cryptographic trust services, virtual execution environment), and underpinning physical computer infrastructure necessary to receive and store new transactions and provide access to auditors, which are seeking to access data entries. The blockchain layer 272 exposes an interface that provides access to the virtual execution environment necessary to process the program code and engage the physical platform 271. Cryptographic trust services 273 are used to verify transactions and maintain private information.

The blockchain configuration of FIG. 2 may process and execute program/application code 275 by way of the interfaces exposed, and the services provided, by blockchain platform 270. The code may control blockchain assets, for example, it can store and transfer data, and may be executed by the blockchain, for example, in the form of a smart contract and associated chain code with conditions or other code elements subject to its execution. The smart contracts 275 may be created to execute reminders, updates, and/or other notifications subject to the changes, updates, etc. The smart contracts can themselves be used to identify rules associated with authorization and access requirements and usage. In one example, a newly scheduled transaction 214 may be identified by the peer nodes 280. The nodes may reach consensus 212 and permit the transaction to be committed to the blockchain ledger 272 provided that certain conditions are satisfied. For example, the transaction may require a reservation for a particular channel via the scheduler to be approved by the consensus peers. In this case, the peers may identify the schedule stored in a database outside the blockchain and determine whether the present member and the present transaction are identified as having a reservation channel on which to write the blockchain transaction. This information can be easily identified by transaction number, user/node identification number and/or channel assignment as commonly known parameters used to identify, verify and provide consensus to permit the transaction to be committed to the blockchain.

Figure 3:
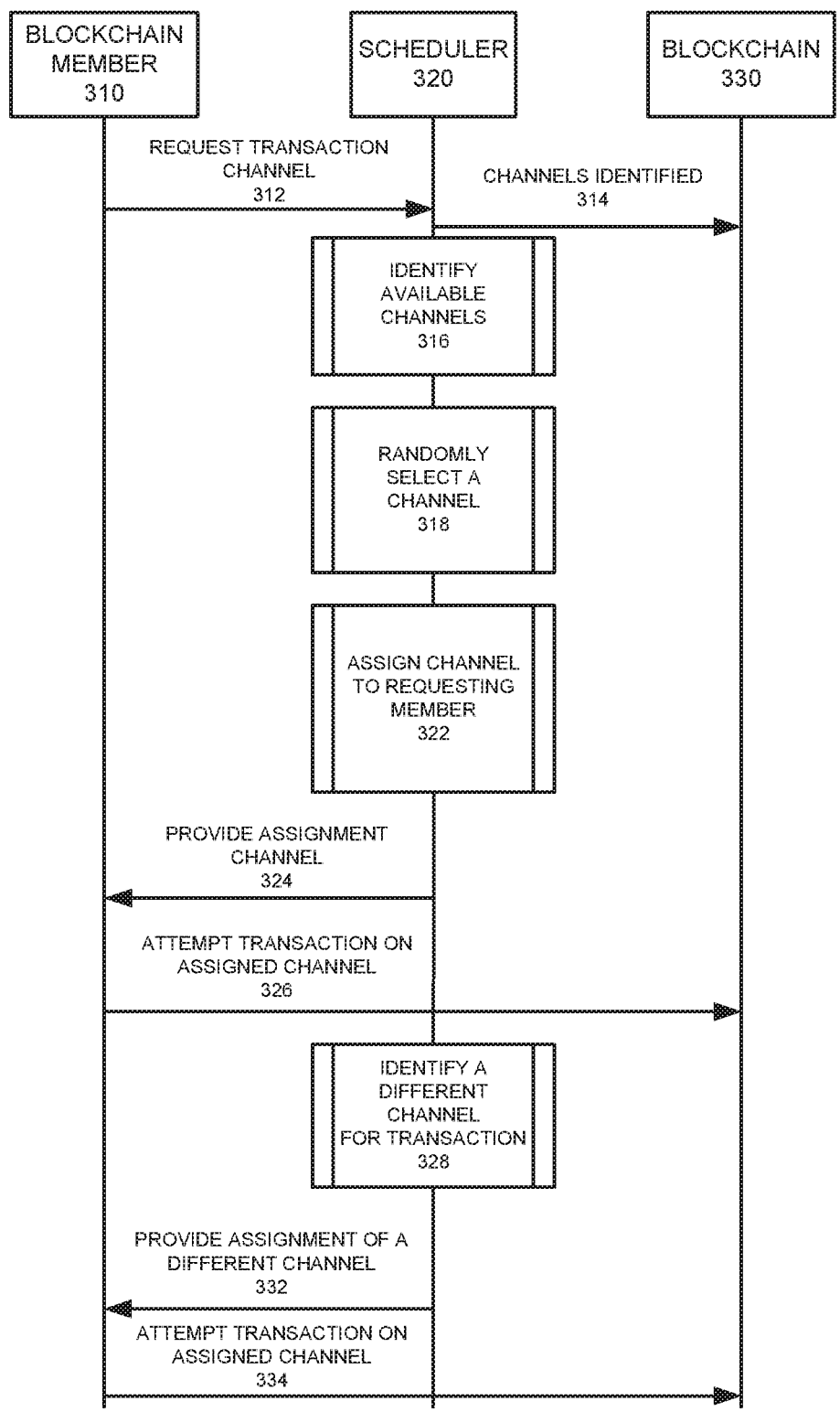
FIG. 3 illustrates a system messaging diagram for processing a blockchain transaction reservation operation, according to example embodiments.

FIG. 3 illustrates a system messaging diagram for processing a blockchain transaction reservation operation, according to example embodiments. Referring to FIG. 3, in this example 300 the various entities include the blockchain member 310, the scheduler 320 and the blockchain 330. The process may proceed with the blockchain member 310 either directly via a formal request message or indirectly (i.e., through transaction submitting actions) requesting a reservation or transaction channel for a present or upcoming transaction 312. The scheduler 320 may be a software module operating on a server outside the blockchain 330. The process may include auditing the blockchain status 314 and determining channels available 316 for assignment. The channel selected for the requesting member may be randomly assigned 318. The assignment may then be made to the requesting member 322 and provided 324 to the member

310. The member may attempt to write 326 the transaction to the blockchain 330 on the assigned channel. In the event that the channel is not available for the transaction, a different channel may be identified 328 and assigned 332, which may have been previously assigned based on a random selection by the scheduler, or, which was assigned responsive to the failed transaction write attempt. The blockchain member 310 may then attempt to write the transaction using the new/alternative channel assignment 334. The peers may agree to the total number of available channels at any given time and any new channels which are to be assigned in the future.

Figure 4A:
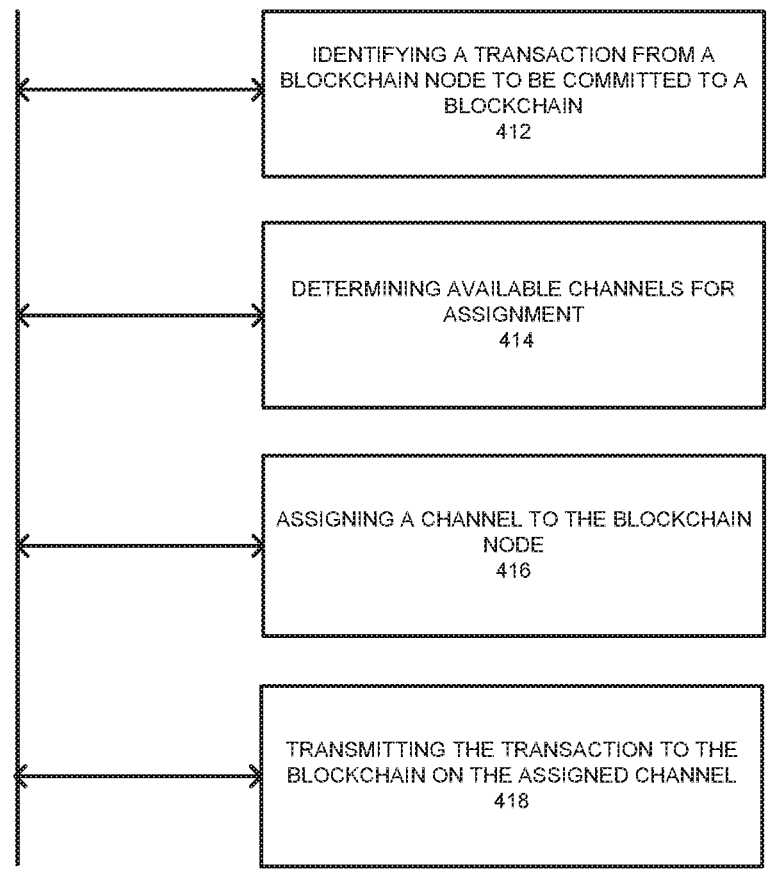
FIG. 4A illustrates a flow diagram of an example method of managing transaction reservations, according to example embodiments.

FIG. 4A illustrates a flow diagram of an example method of scheduling and reserving channels for blockchain transactions, according to example embodiments. Referring to FIG. 4A, the method 400 may provide identifying a transaction from a blockchain node to be committed to a blockchain 412, determining available channels for assignment based on a plurality of available channels 414, assigning a channel to the blockchain node 416, and transmitting the transaction to the blockchain on the assigned channel 418. The assigning a channel may also include randomly selecting a channel from the available channels prior to assigning the channel and also assigning a primary channel and a backup channel(s). The method may also include determining the assigned channel did not commit the transaction, and responsive to identifying the transaction was not committed, assigning a different channel to the blockchain node. A number of channels available for assignment are determined by peer nodes associated with the blockchain. The method may also include storing the blockchain transaction in a transaction buffer until the channel assigned to the blockchain node is ready for the transaction to be committed. The method may also include forfeiting available space in the channel when the channel is assigned to the blockchain node, and creating a new set of channels responsive to the available channels being fully occupied.

Figure 4B:
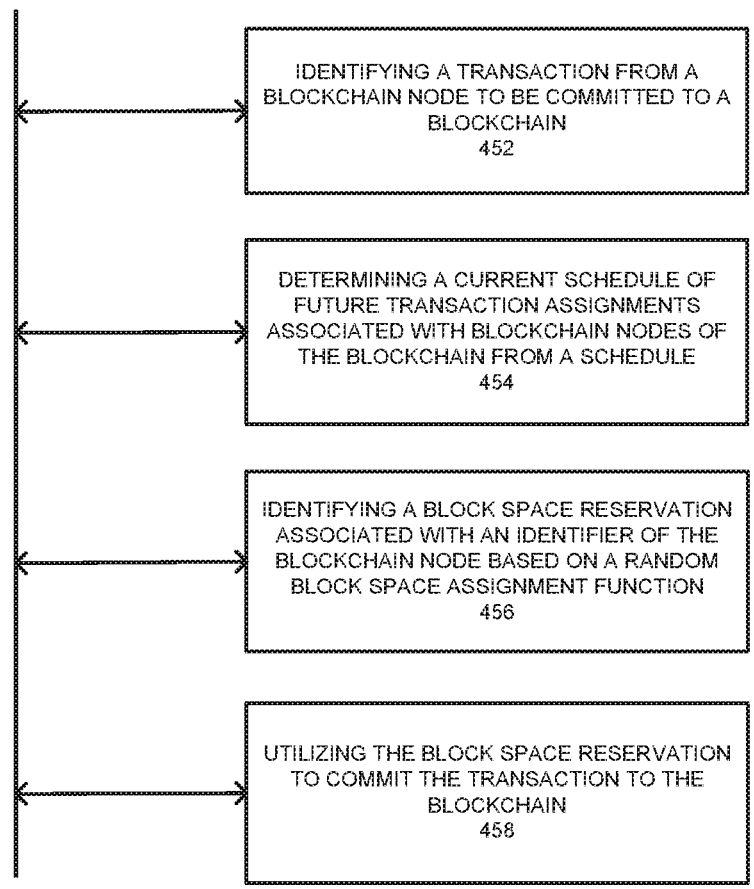
FIG. 4B illustrates another flow diagram of an example method of managing transaction reservations, according to example embodiments.

FIG. 4B illustrates another flow diagram of an example method of scheduling and reserving channels for blockchain transactions, according to example embodiments. Referring to FIG. 4B, the method 450 may include identifying a transaction from a blockchain node to be committed to a blockchain 452, determining available time slots, associated with a blockchain transaction schedule, available for assignment 454, assigning a time slot to the blockchain node 456, transmitting the transaction to the blockchain when the assigned time slot has matured 458.

In addition to requiring a pre-scheduled authorization/assignment of block space to a particular blockchain member for committing a blockchain transaction, other approaches for assigning blockchain reservations to blockchain members may be used to effectively guarantee a block reservation identified by an address and assigned to an identifier of the blockchain members. A random assignment function may provide blockchain members with guaranteed space in any particular blockchain block, which may be assigned ahead of any transaction requiring commitment. In this example, the random assignment offers a no-favor approach to guaranteeing block space by address or other identifiers to each of the blockchain members so there is no lack of opportunity to write to a particular blockchain block. Also, a time slot assignment may be used to assign a time slot to each transaction and/or each blockchain node submitting transactions to provide a fair and optimal procedure for writing blockchain transactions to the blockchain.

Figure 4C:
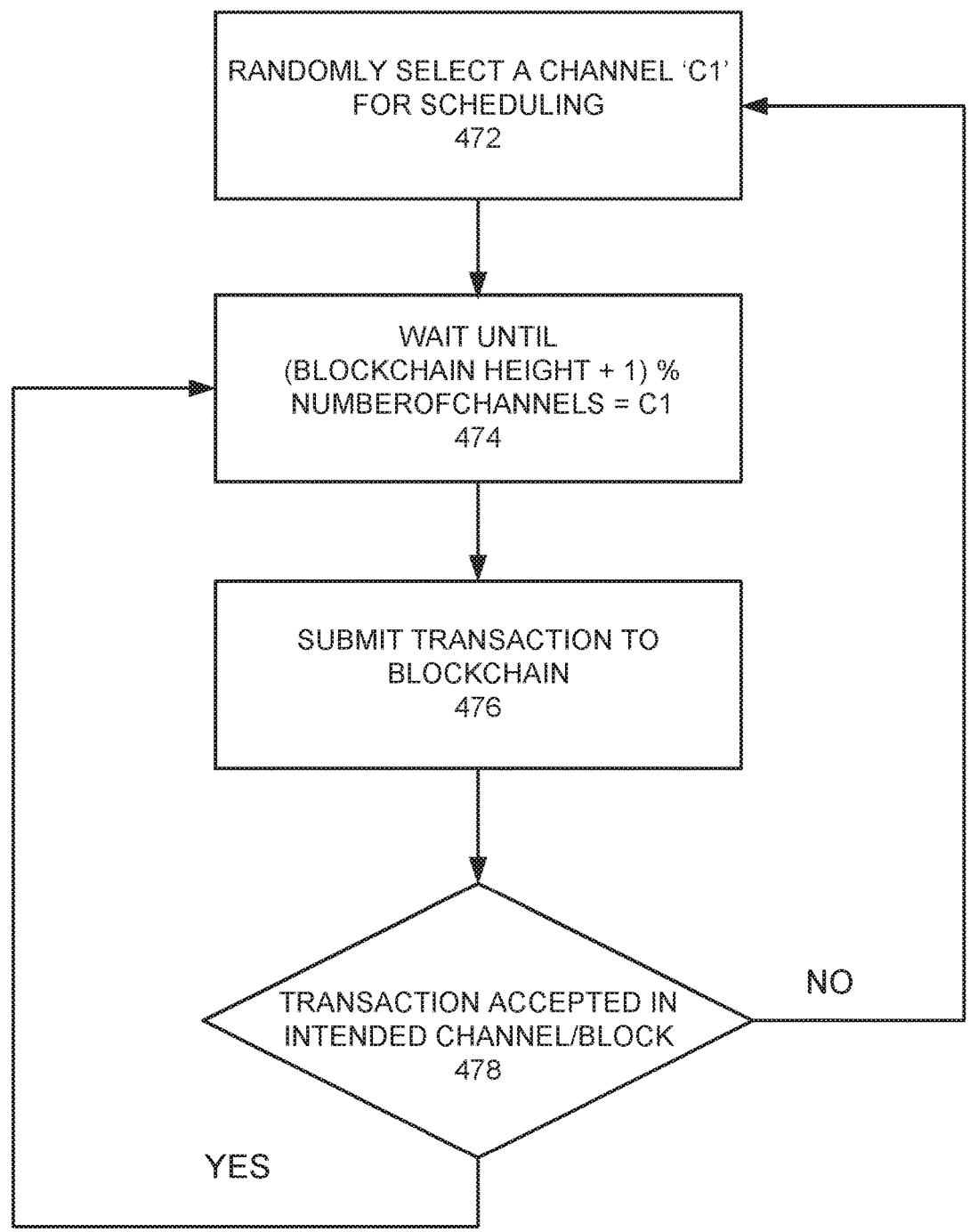
FIG. 4C illustrates logic flow diagram of an example method of managing transaction reservations, according to example embodiments.

FIG. 4C illustrates logic flow diagram of an example method of managing transaction reservations, according to example embodiments. Referring to FIG. 4C, the example flow diagram 470 provides a series of operations, which include, at initialization, peers have agreed upon a certain number of channels. The channels may be randomly selected 'C1' 472, and when the blockchain height+1 percentage of number of channels is equal to C1 474, then a transaction may be submitted for commitment 476. If the transaction is not accepted in the intended channel 478, the process may reassign a channel as a new channel. In one example, a number of channels is six, and a scheduling channel C is selected randomly as one of those six available channels. For instance, a peer node may select channel four and every time channel number four is available, that blockchain member can transmit a transaction. The blockchain member may have to wait until a next block is generated for channel four. For example, a blockchain height, which is a total number of blocks in the blockchain may be 99, and the number of available channels may be six. C=4 is a modulo operator, which provides the remainder after division of one number by another, and thus (blockchain height+1) % numchannels= (99+1) % 6=4. Other procedures for rotating channels and assigning channels to blockchain members may also be used to provide blockchain write access for transactions.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
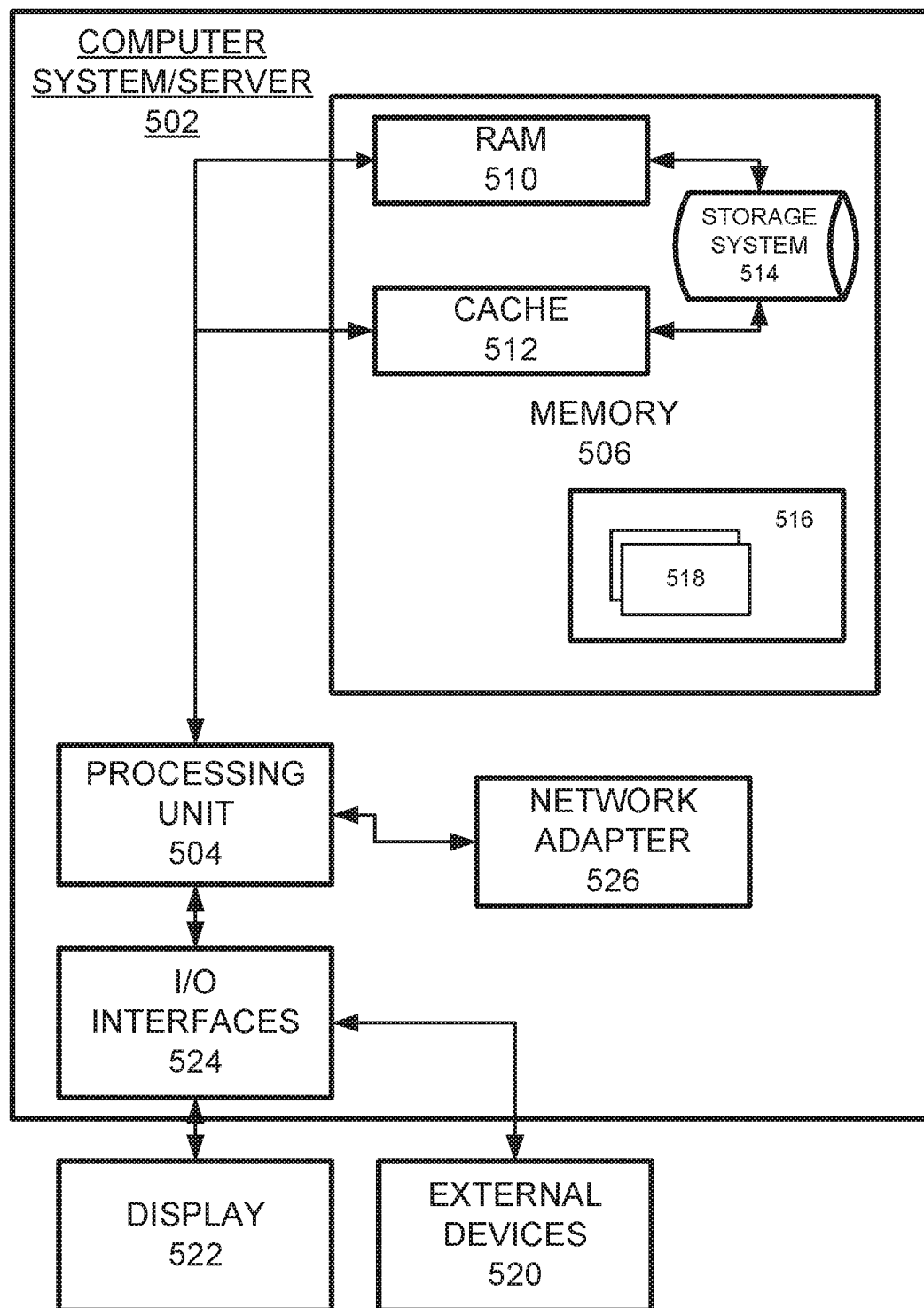
FIG. 5 illustrates an example computer system/server configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove. In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagram of FIG. 3 and the flow chart of FIG. 4. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via the bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   identifying, via a scheduler implemented in a server of a blockchain network, a transaction from a blockchain node, of the blockchain network, to be committed to a blockchain of the blockchain network;
   identifying, via the scheduler, available blocks in the blockchain as channels to be assigned to the blockchain node, where a number of channels (numchannels) is determined by consensus of peer nodes and where each channel is identified by a channel number;
   randomly selecting, via the scheduler, a channel for scheduling the transaction;
   assigning, via the scheduler, the randomly selected channel to the blockchain node, where the blockchain node only sends the transaction to the assigned channel when the assigned channel is available to receive the transaction;
   reserving, via the scheduler, the assigned channel for use by the blockchain node, wherein the assigned channel is to receive the transaction from the blockchain node based on the scheduler identifying that a value given by:
   (a height of the blockchain+1) mod numchannels
   equals the channel number of the randomly selected channel.

2. The method of claim 1, further comprising:
   identifying, via the scheduler, a failure of the assigned channel to commit the transaction to the blockchain; and
   assigning, via the scheduler, a different channel to the blockchain node based on the identified failure.

3. The method of claim 1, further comprising:
   storing the blockchain transaction in a transaction buffer until the channel assigned to the blockchain node is ready for the transaction to be committed.

4. The method of claim 1, further comprising:
   generating, via the scheduler, a schedule containing an identification number associated with the blockchain node and a channel number identifying the channel assigned to the blockchain node.

5. The method of claim 4, further comprising:
   creating a new set of channels responsive to available channels being assigned to blockchain nodes.

6. An apparatus in a blockchain network, the apparatus comprising:
   a processor configured to:
      identify a transaction from a blockchain node, of the blockchain network, to be committed to a blockchain, of the blockchain network;
      identify one or more available blocks in the blockchain as channels to be assigned to the blockchain node, where a number of channels (numchannels) is determined by consensus of peer nodes and where each channel is identified by a channel number;
      randomly select a channel for scheduling the transaction;
      assign the randomly selected channel to the blockchain node, where the blockchain node only sends the transaction to the assigned channel when the assigned channel is available to receive the transaction; and
      reserve the assigned channel for use by the blockchain node, wherein the assigned channel is to receive the transaction from the blockchain node based on identifying that a value given by:
      (a height of the blockchain+1) mod numchannels
      equals the channel number of the randomly selected channel.

7. The apparatus of claim 6, wherein the processor is further configured to:
   identify a failure of the assigned channel to commit the transaction to the blockchain; and
   assign a different channel to the blockchain node based on the identified failure.

8. The apparatus of claim 6, wherein the processor is further configured to:
   store the blockchain transaction in a transaction buffer until the channel assigned to the blockchain node is ready for the transaction to be committed.

9. The apparatus of claim 6, wherein the processor is further configured to:
   generate a schedule containing an identification number associated with the blockchain node and a channel number identifying the channel assigned to the blockchain node.

10. The apparatus of claim 9, wherein the processor is further configured to:
    create a new set of channels responsive to available channels being assigned to blockchain nodes.

11. A non-transitory computer readable storage medium configured to store one or more instructions that when executed by a processor cause the processor to perform:
    identifying a transaction from a blockchain node, of the blockchain network, to be committed to a blockchain of the blockchain network;
    identifying available blocks in the blockchain as channels to be assigned to the blockchain node, where a number of channels (numchannels) is determined by consensus of peer nodes and where each channel is identified by a channel number;
    randomly selecting a channel for scheduling the transaction;
    assigning the randomly selected channel to the blockchain node, where the blockchain node only sends the transaction to the assigned channel when the assigned channel is available to receive the transaction;
    reserving the assigned channel for use by the blockchain node, wherein the assigned channel is to receive the transaction from the blockchain node based on identifying that a value given by:
    (a height of the blockchain+1) mod numchannels
    equals the channel number of the randomly selected channel.

12. The non-transitory computer readable storage medium of claim 11, further comprising one or more instructions that when executed by the processor cause the processor to perform:
    identifying a failure of the assigned channel to commit the transaction to the blockchain; and
    assigning a different channel to the blockchain node based on the identified failure.

13. The non-transitory computer readable storage medium of claim 11, further comprising one or more instructions that when executed by the processor cause the processor to perform:
    storing the blockchain transaction in a transaction buffer until the channel assigned to the blockchain node is ready for the transaction to be committed.

14. The non-transitory computer readable storage medium of claim 11, further comprising one or more instructions that when executed by the processor cause the processor to perform:
    generating a schedule containing an identification number associated with the blockchain node and a channel number identifying the channel assigned to the blockchain node; and
    creating a new set of channels responsive to available channels being assigned to blockchain nodes.

* * * * *